2,409,881

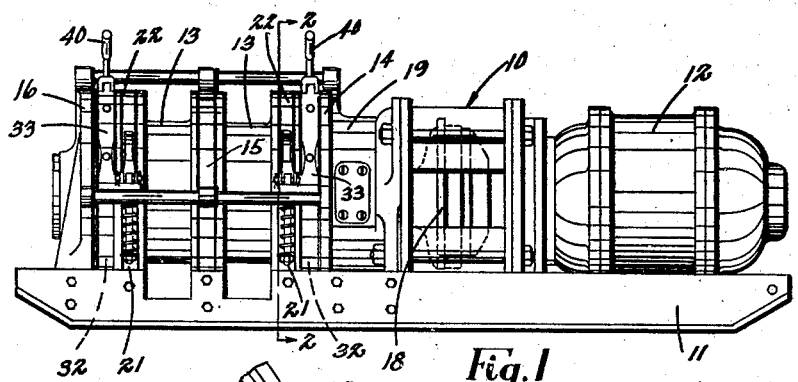
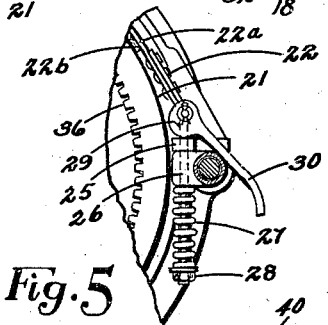
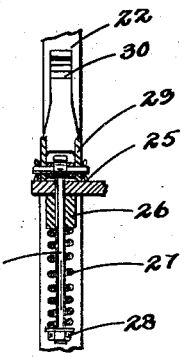
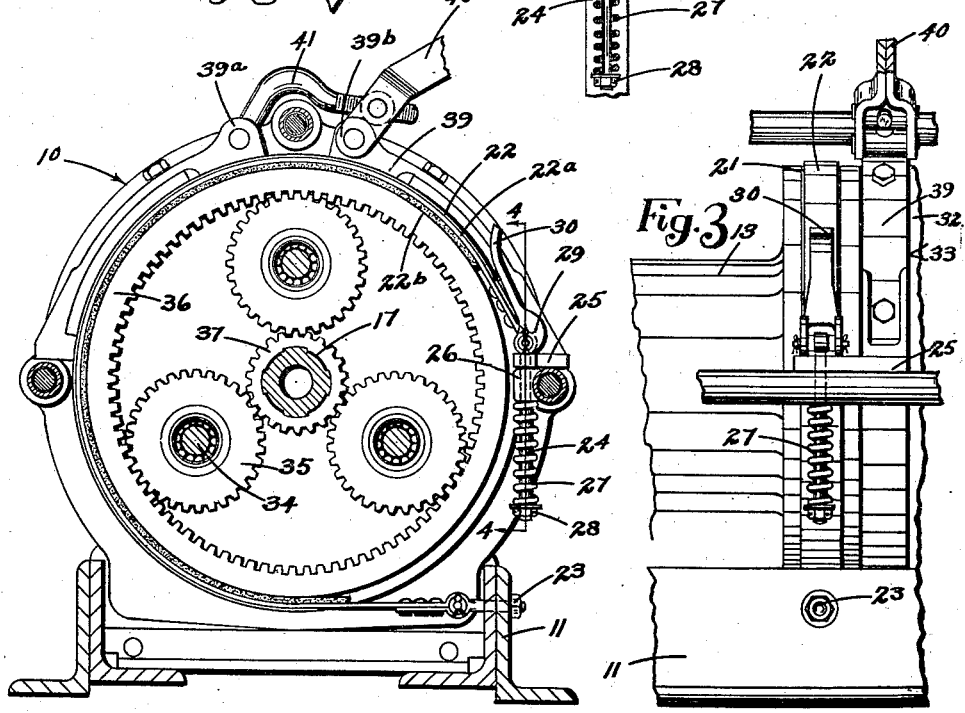
Oct. 22, 1946.  A. MEYER  2,409,881
SNUBBER FOR HOISTS
Filed Aug. 5, 1943
Fig. 1
Fig. 5
Fig. 4
Fig. 2
Fig. 3
INVENTOR
ANDREW MEYER
BY
ATTORNEY Patented Oct. 22, 1946

UNITED STATES PATENT OFFICE 2,409,881

SNUBBER FOR HOISTS

Andrew Meyer, Cleveland Heights, Ohio, assignor to The Cleveland Pneumatic Tool Company, Cleveland, Ohio, a corporation of Ohio Application August 5, 1943, Serial No. 497,425

8 Claims. (Cl. 192—4)

This invention relates generally to winding apparatus or hoists and, more particularly, aims to provide novel snubbing or braking means for a winding drum to prevent backlash and tangling of the cable being wound thereon.

Another object of my invention is to provide novel snubbing means for a winding drum or the like, which is automatically applied upon the release of the means controlling the winding operation.

A further object of this invention to provide improved winding apparatus wherein a friction snubber, which is normally or continuously applied for preventing backlash, is automatically released upon actuation of the brake means controlling the winding operation and is automatically reapplied upon release of the said brake means.

The invention may be further briefly summarized as consisting in certain novel combinations and arrangements of parts hereinafter described and particularly set out in the appended claims.

In the accompanying sheet of drawings,

Fig. 1 is a side elevation of winding apparatus embodying my invention;

Fig. 2 is a transverse sectional view taken through the apparatus on line 2—2 of Fig. 1;

Fig. 3 is a partial side elevation of the apparatus, on a larger scale, showing the interconnection between the friction devices of adjacent drums, that is between the control brake band and the snubber band;

Fig. 4 is a partial vertical sectional view taken on line 4—4 of Fig. 2 and showing the actuating connection for the snubbing means, and Fig. 5 is a partial transverse sectional view showing the tension adjustment for the snubbing means.

More detailed reference will now be made to the drawing in which I show a hoist 10 having my novel snubbing means embodied therein. The hoist comprises, in general, a frame 11 having thereon a driving motor 12 and a pair of rotatable winding drums 13. The frame 11 includes a plurality of upright longitudinally spaced bearing supports 14, 15 and 16, in which a drive shaft 17 (see Fig. 2) is suitably journaled. The winding drums 13 are suitably journaled for rotation about the shaft 17 and the motor 12 is connected with this shaft through a hydraulic coupling 18 and a reduction gear 19.

The remote ends of the winding drums 13 have brake drums 21 bolted thereto, or otherwise connected therewith, so that such brake drums rotate with the respective winding drums. Friction devices or snubbers 22 are associated with the respective brake drums 21 and encircle, or partially encircle, such brake drums. The friction device or snubber 22, in this instance, comprises a brake band 22a having a friction lining 22b for cooperation with the surface of the brake drum 21. One end of the brake band 22a is anchored to the frame 11 as by means of the bolt 23. The other end of the brake band 22a is connected with an eye-bolt 24 which extends through a movable snubber-actuating member 25 and through a guide opening in a stationary portion 26 of the frame 11. The lower portion of the eye-bolt 24 carries a compression spring 27 which is disposed between the nut 28 and the frame portion 26 and acts on the eye-bolt so as to continuously exert a pull on the brake band 22a, tending to apply the snubber to the brake drum 21.

The action of the spring 27 on the brake band 22a can be varied or adjusted by means of a cam 29 having an actuating lever 30. When the cam 29 is in the position shown in Fig. 2, the spring 27 is fully effective in pulling the brake band against the brake drum 21. When the cam is moved to the position shown in Fig. 5, by swinging the lever 30 downwardly, the eye-bolt 24 is lifted to relieve the effect of the spring 27 on the brake band, leaving the cable drum free to turn. The cable may then be unwound manually as is desirable in setting up the apparatus for each new job.

The hoist 10 is provided adjacent each of the brake drums 21 with a planet gear drum 32 which functions as a brake drum and is rotatable on the shaft 17. A friction device 33 is associated with each of the drums 32 and encircles, or partially encircles, the same. Each drum 32 carries one or more spindles 34 on which the planet gears 35, usually employed in hoists of this kind, are rotatably mounted. As shown in Fig. 2, each of the brake drums 21 has an internal gear or ring gear 36 therein which is connected with a drive pinion 37 of the shaft 17 by means of the planet gears 35. When the winding drum 13 is to be rotated, the drum 32 is retarded or held stationary by the friction device 33 and this prevents the planet gears 35 from revolving about the pinion 37 and causes them to rotate on their spindles 34 to transmit torque from the pinion to the ring gear 36. The resulting rotation of the ring gear 36 causes rotation of the brake drum 21 and the winding drum 13 connected thereto. When the winding drum 13 is to be slowed or stopped, the drum 32 is released and permitted to rotate, at which time the gears 35 travel idly around the shaft 17.

The friction devices 33 associated with the respective drums 32 each comprises a band, or the like, 39 having suitable friction lining or shoes for cooperation with the drum surfaces and having ends 39a and 39b adapted to be drawn together by the lever 40 and link 41 when the friction devices 33 are to be applied to the brake drum 32. The friction devices 33 are disposed around the drums 32 so that these devices are capable of limited circumferential shifting with their drums when the friction devices are applied or tightened against the surfaces of the drums. This limited shifting of the friction devices 33 is utilized in actuating the snubbers 22. To this end the friction devices 33 have the snubber actuating members 25 connected therewith.

The snubbers 22 are normally applied or held in frictional engagement with their respective brake drums 21 so as to hold the winding drums against unintentional or excessive rotation which would cause backlash or tangling of the cable. When one of the winding drums 13 is to be rotated, the lever 40 is actuated to apply the friction device 33 to the drum 32 to retard or stop the latter. As explained above, this results in the winding drum being driven from the shaft 17 through the gears 35, 36 and 37. When the friction device 33 is tightened against the drum 32, it is immediately carried or shifted circumferentially by that drum and such movement is transmitted by the member 25 to the active end of the snubber 22 in a direction to compress the spring 27 and release the snubber from its brake drum 21. The release of the snubber 22 permits the winding drum 13 to be freely driven for the desired winding operation. When the winding drum 13 is to be stopped, the lever 40 is swung in the opposite direction to release the friction device 33, whereupon, the spring 27 immediately applies or tightens the snubber 22 against the brake drum 21 to prevent overrunning of the winding drum which would cause backlash and tangling of the cable. In addition to applying the snubber 22 against its brake drum, the spring 27 also acts through the member 25 to return the friction device 33 to its initial position.

It will be seen from the foregoing description and the accompanying drawing that I have provided an improved winding apparatus or hoist in which a snubber for the winding drum is automatically released upon actuation of the friction device controlling the winding operation and is automatically reapplied upon release of said friction device. It will be seen also that this automatic snubbing action is obtained through the use of simplified apparatus utilizing the circumferential shifting of the friction device 33, for actuating the snubber.

While I have illustrated and described my improved winding apparatus and novel snubbing means in more or less detail, it will be understood of course that I do not wish to be correspondingly limited but regard my invention as including all changes and modifications coming within the spirit of the invention and the scope of the appended claims.

Having thus described my invention, I claim:

1. In apparatus of the character described, a pair of adjacent rotatable drums, a friction device associated with one of said drums and adapted to be applied thereto to retard rotation of said one drum, said friction device when set to grip its drum being capable of limited movement with said one drum, and a friction device associated with the second drum to retard rotation thereof and adapted to be released in response to said limited movement of the first friction device.

2. In apparatus of the character described, a pair of adjacent rotatable drums, friction devices associated with the respective drums, one of said friction devices being normally applied to it drum and the other being normally released from its drum, means for applying said other friction device, and means energized by drum movement for automatically releasing said one friction device in response to the application of said other friction device and leaving said one friction device free to resume its normal applied position in response to the release of said other friction device.

3. In apparatus of the character described, a pair of adjacent rotatable drums, friction devices associated with the respective drums, a spring acting to apply one of said friction devices to its drum to retard rotation thereof, means operable to apply the other friction device to its drum, said other friction device when set to grip its drum being capable of limited shifting with its drum, and means carried by said other friction device and adapted to cooperate with said one friction device to release the same in opposition to said spring in response to said limited shifting.

4. In an apparatus of the character described, a pair of adjacent rotatable drums, friction devices comprising brake bands associated with said drums, portions of said brake bands being movable in opposite directions to grip the respective drums, and a direct connection between said portions energized by drum movement for automatically relieving the gripping action of one device when the other device is caused to grip its drum.

5. In an apparatus of the character described, a pair of adjacent rotatable drums, friction devices comprising brake bands associated with said drums, portions of said brake bands being movable in opposite directions to grip the respective drums, means for causing one of said devices to grip its drum, and a direct connection between said portions energized by drum movement for automatically relieving the gripping action of the other device when the first device is caused to grip its drum.

6. In a hoist of the character described, a rotatable winding drum having a brake drum connected therewith, a snubber associated with the brake drum, means for establishing a driving connection with said winding drum including a second rotatable brake drum and a friction device associated with the latter which when applied to the drum is movable therewith to a limited extent, means operable to apply or release said friction device, and means for automatically releasing and reapplying said snubber in response to the movements of said friction device following its application to or release from said second drum.

7. In a hoist of the character described, a rotatable winding drum having a brake drum connected therewith, a snubber associated with the brake drum and normally applied thereto to prevent overrunning of the winding drum, means for establishing a driving connection with said winding drum including a second rotatable brake drum and a friction device associated with the latter which when applied to the drum is movable therewith to a limited extent, means operable to apply or release said friction device for controlling said driving connection, and means interconnecting said friction device with said snubber for automatically releasing the latter in response to the application of said friction device.

8. An apparatus of the character described, two rotatable brake drums, a drive shaft extending into said drums and carrying a pinion, a ring gear carried by the first brake drum, a planet gear carried by the second brake drum and disposed between said pinion and ring gear, friction devices associated with the respective drums, means normally holding the friction device of the first brake drum applied thereto, means for temporarily applying the other friction device for retarding the second drum and causing said first brake drum to be driven through said gears, the last mentioned friction device being capable of limited shifting with its drum when applied thereto, and means responsive to such shifting of said last mentioned friction device for automatically releasing the friction device of the first brake drum.

ANDREW MEYER.